US011500550B2

(12) United States Patent
Das (10) Patent No.: US 11,500,550 B2
(45) Date of Patent: Nov. 15, 2022

(54) INHIBITING MEMORY ACCESSES TO EXECUTABLE MODULES

(71) Applicant: Red Hat, Inc., Raleigh, NC (US)

(72) Inventor: Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 162 days.

(21) Appl. No.: 16/552,007

(22) Filed: Aug. 27, 2019

(65) Prior Publication Data

US 2021/0064252 A1    Mar. 4, 2021

(51) Int. Cl.
*G06F 3/06*       (2006.01)
*G06F 9/455*      (2018.01)

(52) U.S. Cl.
CPC .......... *G06F 3/0622* (2013.01); *G06F 3/0664* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 8,745,308 B2 | 6/2014 | Chen et al. |
| 9,384,024 B2 | 7/2016 | Ramakrishnan Nair |
| 9,665,373 B2 | 5/2017 | Lemay et al. |
| 9,747,172 B2 | 8/2017 | Epstein |
| 9,842,065 B2 | 12/2017 | Banginwar et al. |
| 10,241,819 B2 | 3/2019 | Chen et al. |
| 2009/0328195 A1* | 12/2009 | Smith ............... G06F 21/575 726/16 |
| 2013/0007379 A1* | 1/2013 | Kegel ............... G06F 21/78 711/154 |
| 2014/0173600 A1* | 6/2014 | Ramakrishnan Nair ............... G06F 9/4555 718/1 |
| 2016/0117229 A1* | 4/2016 | Epstein ............... G06F 12/145 714/6.23 |
| 2016/0335194 A1* | 11/2016 | Eddy ............... G06F 12/1009 |
| 2017/0249173 A1* | 8/2017 | Tsirkin ............... G06F 12/1009 |
| 2017/0250817 A1* | 8/2017 | Bonzini ............... H04L 9/3247 |
| 2017/0262306 A1* | 9/2017 | Wang ............... G06F 9/5027 |
| 2017/0329618 A1* | 11/2017 | Tsirkin ............... G06F 8/65 |
| 2018/0321963 A1* | 11/2018 | Amit ............... G06F 21/60 |
| 2021/0026785 A1* | 1/2021 | Wei ............... G06F 12/109 |

OTHER PUBLICATIONS

Brookes, Scott, et al., "ExOShim: Preventing Memory Disclosure using Execute-Only Kernel Code," Thayer School of Engineering at Dartmouth College, 2015, 11 pages.

Frassetto, Tommaso, et al., "IMIX: In-Process Memory Isolation Extension," Proceedings of the 27th USENIX Security Symposium, Aug. 15-17, 2018, Baltimore, Maryland, pp. 83-97.

* cited by examiner

*Primary Examiner* — Tracy C Chan
(74) *Attorney, Agent, or Firm* — Dority & Manning, P.A.

(57) ABSTRACT

Inhibiting memory accesses to executable modules. A hypervisor executing on a computing host initiates a virtual machine comprising a guest operating system. The hypervisor receives a communication from the guest operating system requesting that a range of memory utilized by the guest operating system be identified as being execute-only access. The hypervisor marks at least one physical page of memory that includes the range of memory as being execute-only access.

13 Claims, 5 Drawing Sheets

INHIBITING MEMORY ACCESSES TO EXECUTABLE MODULES

BACKGROUND

An operating system executing on a computing device often must communicate with a variety of different components manufactured by a variety of different manufacturers, such as, by way of non-limiting example, network interface devices, storage devices, graphics cards, sound cards, Universal Serial Bus (USB) devices, printers, and the like. Typically such devices require that the operating system load or initiate an executable module that facilitates communication with the respective device.

SUMMARY

The examples disclosed herein eliminate an ability for an executable module or other malicious code to rewrite the executable code of the module after the executable code has been loaded into memory.

In one example a method is provided. The method includes initiating, by a hypervisor executing on a computing host comprising a processor device, a virtual machine including a guest operating system. The method further includes receiving, by the hypervisor, a request from the guest operating system requesting that a range of memory utilized by the guest operating system be identified as being execute-only access. The method further includes marking, by the hypervisor, at least one physical page of memory that includes the range of memory as being execute-only access.

In another example a computing device is provided. The computing device includes a memory and a processor device coupled to the memory. The processor device is to initiate a hypervisor. The processor device is further to initiate, by the hypervisor, a virtual machine including a guest operating system. The processor device is further to receive, by the hypervisor, a request from the guest operating system requesting that a range of memory utilized by the guest operating system be identified as being execute-only access. The processor device is further to mark, by the hypervisor, at least one physical page of memory that includes the range of memory as being execute-only access.

In another example a computer program product is provided. The computer program product is stored on a non-transitory computer-readable storage medium and includes instructions configured to cause a processor device to initiate a hypervisor. The instructions further cause the processor device to initiate, by the hypervisor, a virtual machine including a guest operating system. The instructions further cause the processor device to receive, by the hypervisor, a request from the guest operating system requesting that a range of memory utilized by the guest operating system be identified as being execute-only access, and mark, by the hypervisor, at least one physical page of memory that includes the range of memory as being execute-only access.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

An operating system executing on a computing device often must communicate with a variety of different components manufactured by a variety of different manufacturers, such as, by way of non-limiting example, network interface devices, storage devices, graphics cards, sound cards, Universal Serial Bus (USB) devices, printers, and the like. Typically such devices require that the operating system load or initiate an executable module that facilitates communication with the respective device.

Often third-party executable modules, such as loadable kernel modules and firmware modules, are necessary for one or more components of a computing device to operate properly. Sometimes such executable modules even have certain system privileges that user modules do not have. Unfortunately, the manufacturer of the operating system generally has no means of knowing whether or not such an executable module can be trusted, and thus initiating a kernel module carries at least some risk that the kernel module may be malicious.

One mechanism by which an executable module can cause harm is to, once initiated, rewrite the instructions in the memory in which the executable module has been loaded with malicious instructions, and then execute the rewritten instructions. Moreover, instructions in memory can inadvertently be altered in some circumstances, such as via a buffer overflow.

The examples disclosed herein eliminate an ability for an executable module to rewrite the executable code of the executable module after the executable code has been loaded into memory. In particular, a guest operating system of a virtual machine may initiate an executable module into a range of memory. The guest operating system then requests a hypervisor of the computing host on which the virtual machine exists to mark the physical memory that corresponds to the range of memory to be execute-only access. The term "execute-only" as used herein refers to a processor device feature wherein a portion of memory can be marked to prohibit a process from reading from or writing to the portion of memory, but which continues to allow instruction fetches to be performed against the portion of memory so that executable instructions can be obtained from the portion of memory. If the executable module attempts to read or write any memory in the memory range that has been marked execute-only access, the executable module will cause an exception. The range of memory marked as being execute-only access does not contain literal data or data that needs to be copied.

Figure 1:
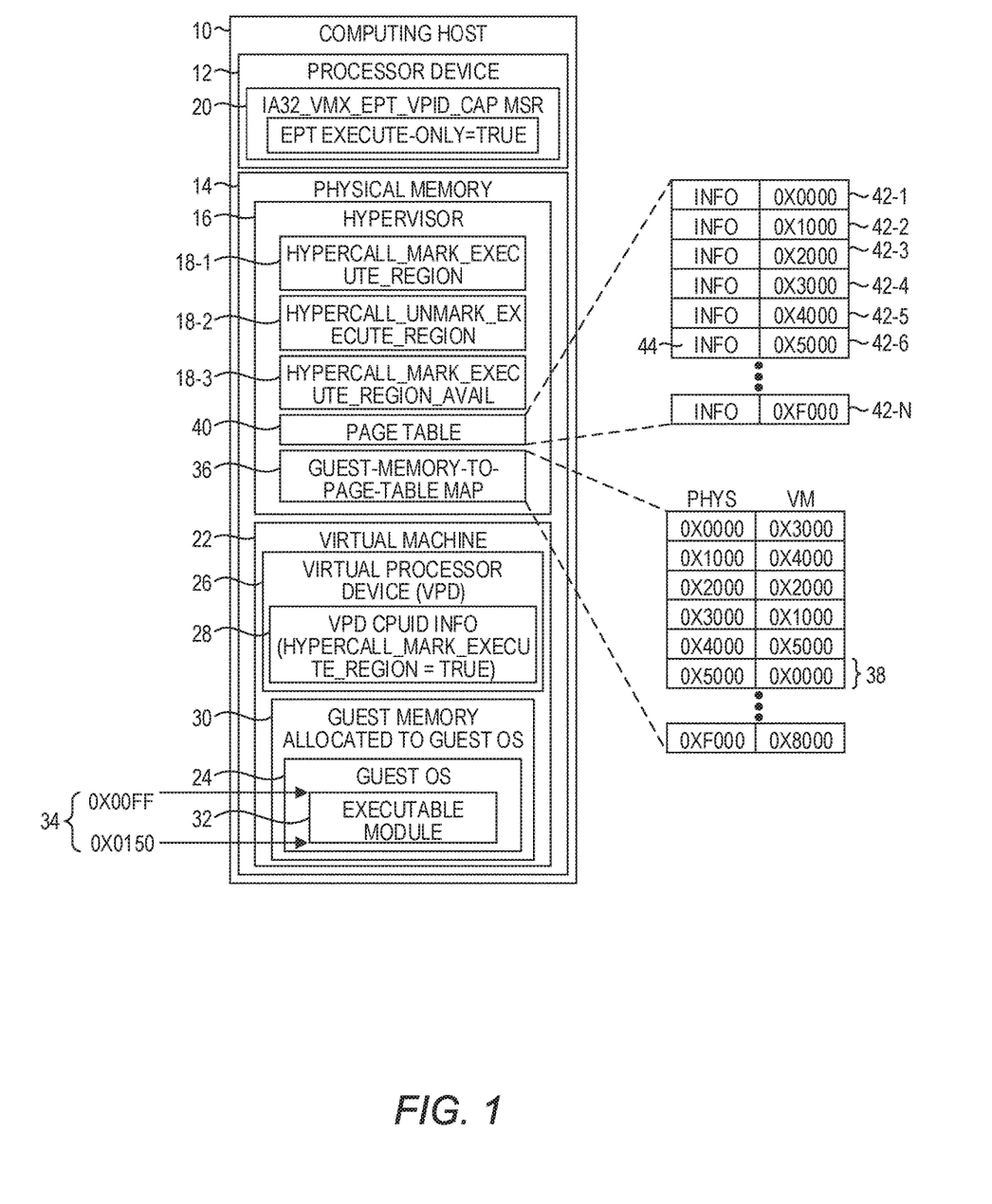
FIG. 1 is a block diagram of a computing host according to one example.

FIG. 1 is a block diagram of a computing host 10 according to one example. The computing host 10 includes a processor device 12 and a memory 14. The processor device 12 segments the memory 14 into units referred to as memory pages. While the size of a memory page can vary among processor types, often the size of a memory page is 4096 bytes (i.e., 4 kilobytes).

The computing host 10 offers a virtualized environment via a hypervisor 16, sometimes referred to as a virtual machine monitor. The hypervisor 16 may comprise any suitable virtual machine monitor, such as a Kernel-based Virtual Machine (KVM) hypervisor, Xen hypervisor, VMware ESX/ESXi hypervisor, or the like. The hypervisor 16 includes one or more hypercall functions 18-1-18-3, which are functions that a guest operating system in a virtual machine can invoke to communicate with the hypervisor 16.

Because the hypervisor 16 is a component of the computing host 10, functionality implemented by the hypervisor 16 may be attributed to the computing host 10 generally. Moreover, in examples where the hypervisor 16 comprises software instructions that program the processor device 12 to carry out functionality discussed herein, functionality implemented by the hypervisor 16 may be attributed herein to the processor device 12.

The hypervisor 16 determines whether the processor device 12 has a capability to limit access to the physical pages of the memory 14 to execute-only access. The mechanism for determining this differs depending on the particular architecture of the processor device 12. In an Intel® processor device, this determination may be made by accessing the IA32_VMX_EPT_VPID_CAP (48CH) of a model-specific register (MSR) 20 (sometimes referred to as a control register). In this example, it will be assumed that the MSR 20 indicates that the processor device 12 has the capability to limit access to the physical pages of the memory 14 to execute-only access.

The hypervisor 16 runs a virtual machine (VM) 22 that includes a guest operating system (OS) 24. The guest OS 24 may comprise any suitable operating system, including, by way of non-limiting example, a Linux operating system, a Windows® operating system, or the like. The guest OS 24 is configured to determine whether the processor device 12 has the capability to limit access to the physical pages of the memory 14 to execute-only access; however, the guest OS 24, due to the virtualization implemented via the VM 22, may have no ability to directly query the processor device 12. The hypervisor 16 thus provides information that the guest OS 24 can access to determine whether or not the processor device 12 has the capability to limit access to the physical pages of the memory 14 to execute-only access. This may be done in any suitable manner via which the guest OS 24 and the hypervisor 16 can exchange information.

By way of non-limiting example, in one implementation, as part of running the VM 22, the hypervisor 16 provides the VM 22 a virtual processor device 26. By convention, in response to determining that the processor device 12 has the capability to limit access to the physical pages of the memory 14 to execute-only access, the hypervisor 16 sets a bit in CPUID information 28 that corresponds to the virtual processor device 26 (e.g., a HYPERCALL_MARK_EXECUTE_REGION bit). The guest OS 24 may then query the CPUID information 28 of the virtual processor device 26, and access the bit to determine whether or not the processor device 12 has the capability to limit access to the physical pages of the memory 14 to execute-only access. In another implementation, the hypervisor 16 provides a hypercall function 18-3 which, when invoked by the guest OS 24, returns a true value if the processor device 12 has the capability to limit access to the physical pages of the memory 14 to execute-only access, and a false value if not.

When the guest OS 24 initiates, the guest OS 24, for example, invokes the hypercall function 18-3, or requests the CPUID information 28 of the virtual processor device 26, to determine whether the processor device 12 has the capability to limit access to the physical pages of the memory 14 to execute-only access. The guest OS 24 executes in a guest memory 30, which is a portion of the physical memory 14 that was allocated to the VM 22 by the hypervisor 16 when the hypervisor 16 ran the VM 22. The guest memory 30 comprises logical memory addresses that typically differ from the physical memory addresses of the physical memory 14. Thus the guest OS 24 does not access the physical memory 14 directly, the guest OS 24 accesses the physical memory 14 via the logical memory addresses of the guest memory 30, which are then, prior to read, write, or fetch access to the corresponding physical memory address(es), translated by a translation mechanism to the corresponding physical memory address(es).

As part of initialization, or in response to some event, the guest OS 24 determines that an executable module 32 is to be initiated. The executable module 32 may comprise any type of executable module, including, by way of non-limiting example, a loadable kernel module or a firmware module. The guest OS 24 initiates the executable module 32 into the memory 14 at a range of guest OS memory addresses 34. The guest OS 24 then invokes the hypercall function 18-1 (e.g., HYPERCALL_MARK_EXECUTE_REGION) including the range of guest OS memory addresses 34 to request that the physical memory that corresponds to the range of guest OS memory addresses 34 be identified as being execute-only access. The hypercall function 18-1 then accesses a guest-memory-to-page-table map 36 that maps guest OS memory addresses to physical memory addresses, and translates the range of guest OS memory addresses 34 to a range of physical memory addresses. The hypercall function 18-1 determines at least one physical page of memory 14 that includes the memory addressed by the range of physical memory addresses. In this example, the range of guest OS memory addresses 34 (i.e., 0x00FF-0x0150) translates to a range of physical memory addresses contained in the 4 KB physical memory page beginning at physical memory address 0x5000, per the entry 38 of the guest-memory-to-page-table map 36.

The hypercall function 18-1 accesses a page table 40. The page table 40 comprises a plurality of page table entries 42-1-42-N (generally, page table entries 42), each page table entry 42 corresponding to a physical page of the memory 14. The page table 40, in an Intel® processor device environment, may be referred to as an extended page table (EPT). In this example, the page table entry 42-6 corresponds to the 4 KB physical page of memory 14 beginning at physical memory address 0x5000. The hypercall function 18-1 accesses the page table entry 42-6, and modifies information 44 in the page table entry 42-6 to identify the at least one physical page of memory 14 as being execute-only access. The processor device 12 uses the information 44 to identify access rights to the 4 KB physical page of memory 14 beginning at physical memory address 0x5000. Such access may be limited to, for example, read-only access, write-only access, read and write access, or execute-only access (instruction fetches only). Thereafter, the executable module 32 may not read or write the memory contained at the range of guest OS memory addresses 34, and if the executable module 32 attempts to do so, will cause an exception to occur.

At some subsequent point in time, the guest OS 24 may determine that the executable module 32 may be terminated and removed from the memory contained at the range of guest OS memory addresses 34. The guest OS 24 removes the executable module 32 from the memory at the range of guest OS memory addresses 34, and communicates a request to the hypervisor 16 to identify the memory at the range of guest OS memory addresses 34 as not being limited to execute-only access. This communication may be implemented in any desired manner. In one example, the guest OS 24 may invoke a hypercall function 18-2, and include in the invocation the range of guest OS memory addresses 34. In response, the hypercall function 18-2 determines, similar to the manner discussed above with regard to the hypercall function 18-1, that the page table entry 42-6 of the page table 40 corresponds to the physical page of the memory 14 that encompasses the memory 14 contained at the range of guest OS memory addresses 34, and modifies the information 44 in the page table entry 42-6 to identify the at least one physical page of memory 14 as not being execute-only access.

While in this example the range of guest OS memory addresses 34 are encompassed in a single physical memory page of the memory 14, for other executable modules the range of guest OS memory addresses may be contained in multiple physical pages of the memory 14. In such situations, the hypercall function 18-1 accesses the guest-memory-to-page-table map 36, and translates the guest OS memory addresses to a range of physical memory addresses and determines that the guest OS memory addresses are contained in a plurality of the physical pages of the memory 14. The hypercall function 18-1 accesses the page table 40, and for each page table entry 42 that corresponds to one of the plurality of physical pages of the memory 14 that include any portion of the memory corresponding to the range of guest OS memory addresses, marks the corresponding information 44 of the page table entry 42 to identify the corresponding physical page of memory 14 as being execute-only access.

Figure 2:
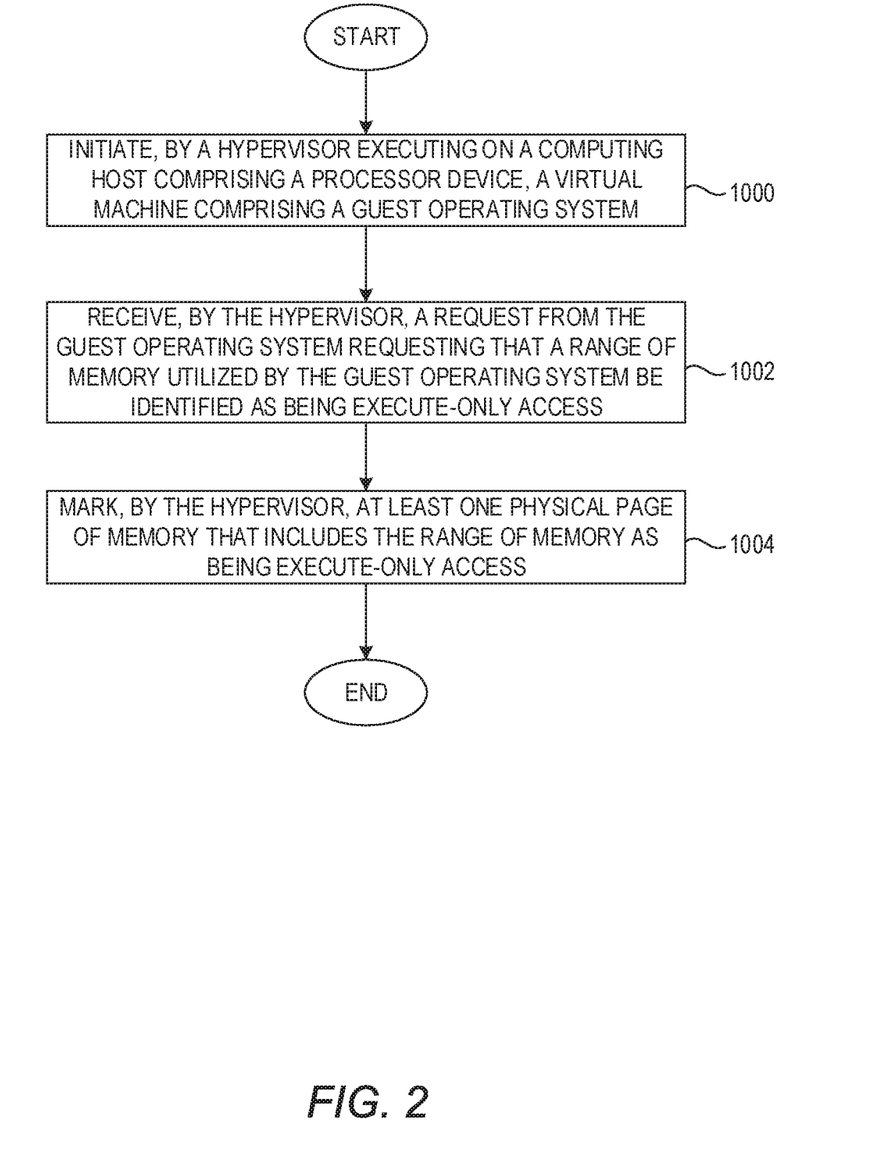
FIG. 2 is flowchart of a method for inhibiting executable memory accesses by executable modules according to one implementation.

FIG. 2 is flowchart of a method for inhibiting executable memory accesses by executable modules according to one implementation. FIG. 2 will be discussed in conjunction with FIG. 1. The hypervisor 16 initiates the VM 22 which comprises the guest OS 24 (FIG. 2, block 1000). The hypervisor 16 receives a communication from the guest OS 24 requesting that the range of memory 14 identified by the range of guest OS memory addresses 34 and utilized by the guest OS 24 be identified as being execute-only access (FIG. 2, block 1002). The hypervisor 16 marks at least one physical page of memory 14 that includes the range of memory identified by the range of guest OS memory addresses 34 as being execute-only access (FIG. 2, block 1004).

Figure 3:
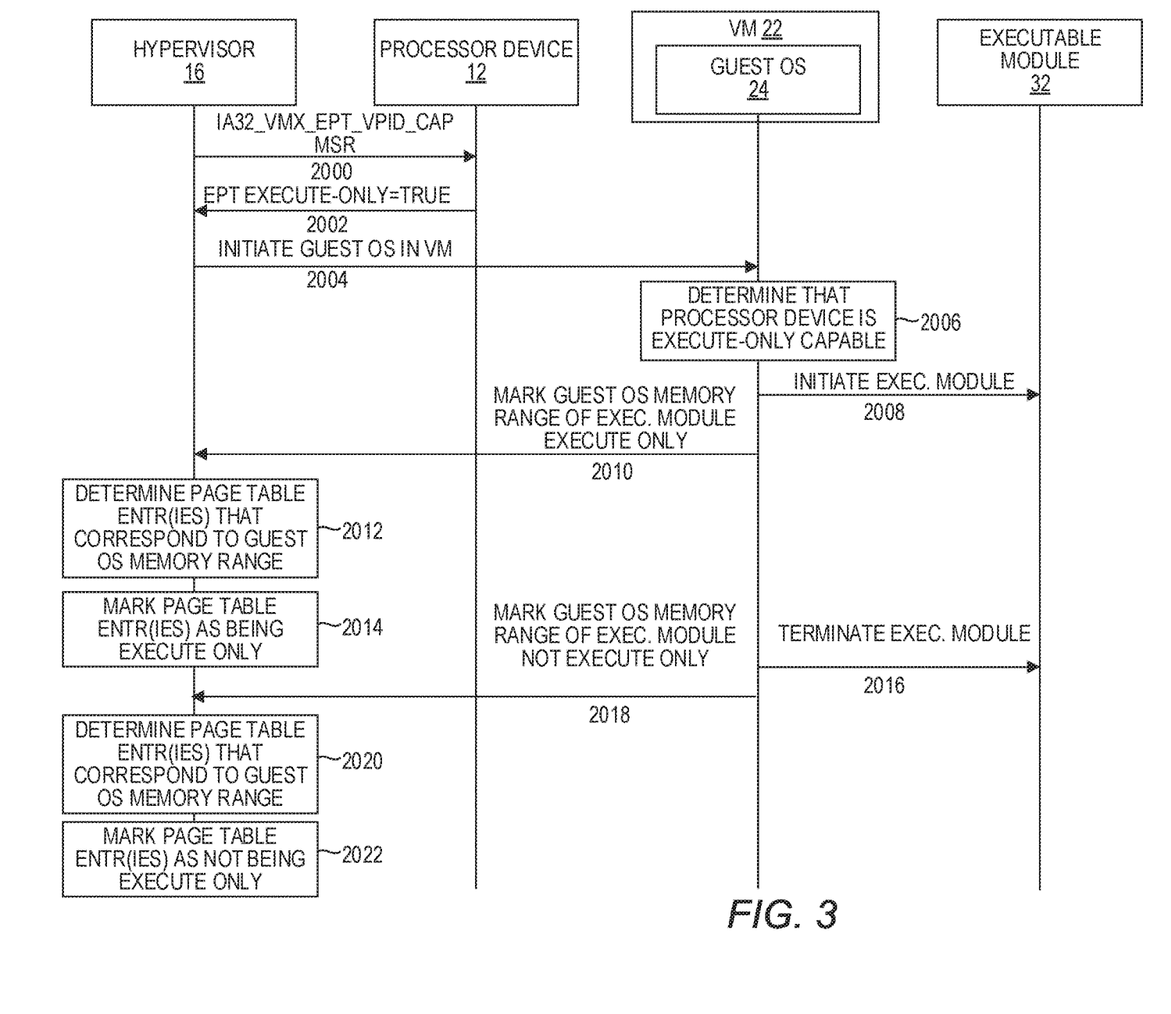
FIG. 3 is a message flow diagram illustrating an example sequence of messages and actions for inhibiting executable memory accesses by executable modules according to one implementation.

FIG. 3 is a message flow diagram illustrating an example sequence of messages and actions for inhibiting executable memory accesses by executable modules according to one implementation. The hypervisor 16 determines that the processor device 12 has the capability to limit access to physical pages of the memory 14 to execute-only access by querying the IA32_VMX_EPT_VPID_CAP (48CH) of the MSR 20 (steps 2000, 2002). The hypervisor 16 then runs the VM 22, and the guest OS 24 is initiated (step 2004). The guest OS 24 determines that the processor device 12 has the capability to limit access to physical pages of the memory 14 (step 2006). This determination may be made via any mechanism by which the hypervisor 16 can pass information to the guest OS 24, including, by way of non-limiting example, the hypercall function 18-3, or by modifying the CPUID information 28, which the guest OS 24 can query.

The guest OS 24 initiates the executable module 32 (step 2008). The guest OS 24 sends a communication to the hypervisor 16 requesting that the range of memory 14 in which the executable module 32 executes be identified as being execute-only access (step 2010). In one implementation, this may be accomplished by passing the range of guest OS memory addresses 34 to the hypervisor 16 via the hypercall function 18-1. The hypervisor 16 determines the page table entr(ies) 42 that correspond to the page(s) of memory 14 that include memory referred to by the range of guest OS memory addresses 34, and then marks such page table entr(ies) 42 as being execute-only access (steps 2012, 2014). This may be accomplished, by way of non-limiting example, via the guest-memory-to-page-table map 36 and the page table 40, as discussed above.

The guest OS 24 subsequently terminates the executable module 32 and removes the executable module 32 from the range of guest OS memory addresses 34 (step 2016). The guest OS 24 then sends a request to the hypervisor 16 to identify the memory 14 that corresponds to the range of guest OS memory addresses 34 as not being limited to execute-only access. This may be accomplished, for example, via the hypercall function 18-3 (step 2018). The hypervisor 16 determines the page table entr(ies) 42 that correspond to the page(s) of memory 14 that include memory referred to by the range of guest OS memory addresses 34, and then mark such page table entr(ies) 42 as not being execute-only access (steps 2020, 2022).

Figure 4:
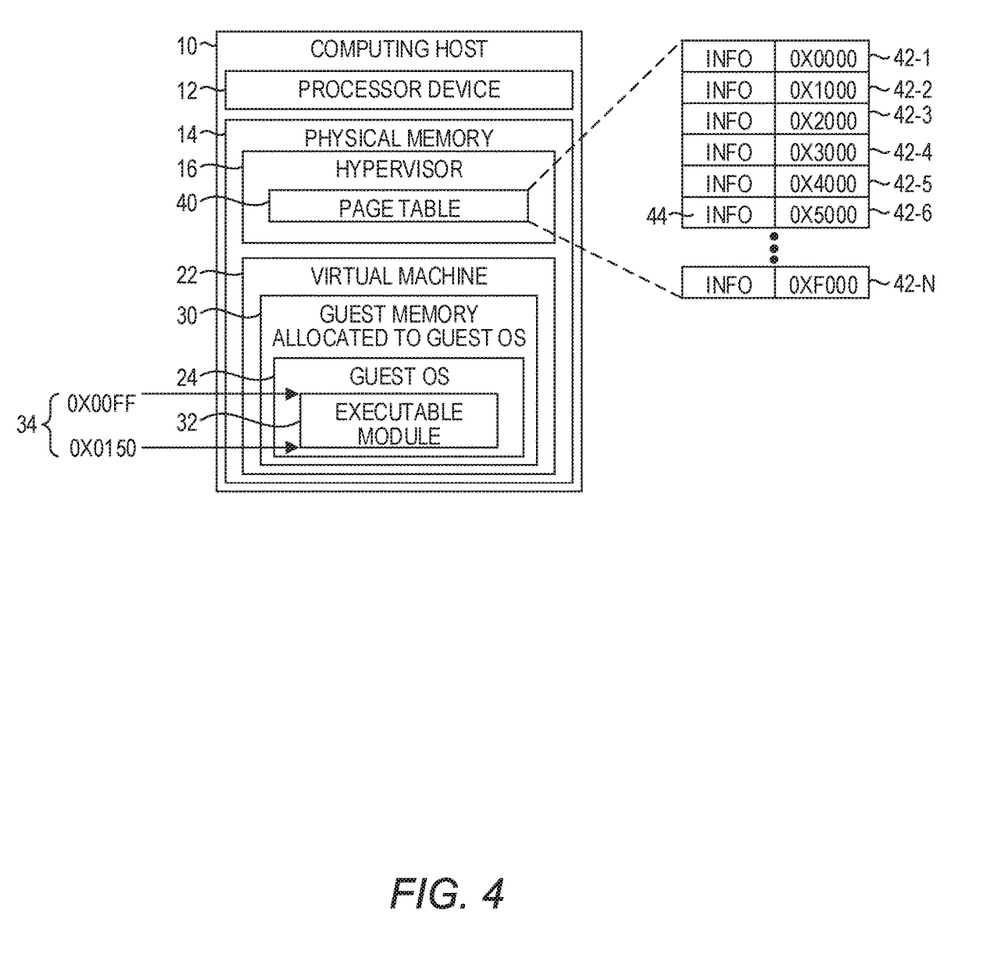
FIG. 4 is a simplified block diagram of the computing host illustrated in FIG. 1 according to one implementation.

FIG. 4 is a simplified block diagram of the computing host 10 illustrated in FIG. 1 according to one implementation. The computing host 10 includes the memory 14 and the processor device 12 coupled to the memory 14. The processor device 12 is to initiate the hypervisor 16. The processor device 12 is further to initiate, via the hypervisor 16, the virtual machine 22 comprising the guest OS 24. The processor device 12 is further to receive, via the hypervisor 16, the communication from the guest OS 24 requesting that the range of guest OS memory addresses 34 utilized by the guest OS 24 be identified as being execute-only access. The processor device 12 is further to mark, by the hypervisor 16, at least one physical page of the memory 14 that includes the range of guest OS memory addresses 34 as being execute-only access.

Figure 5:
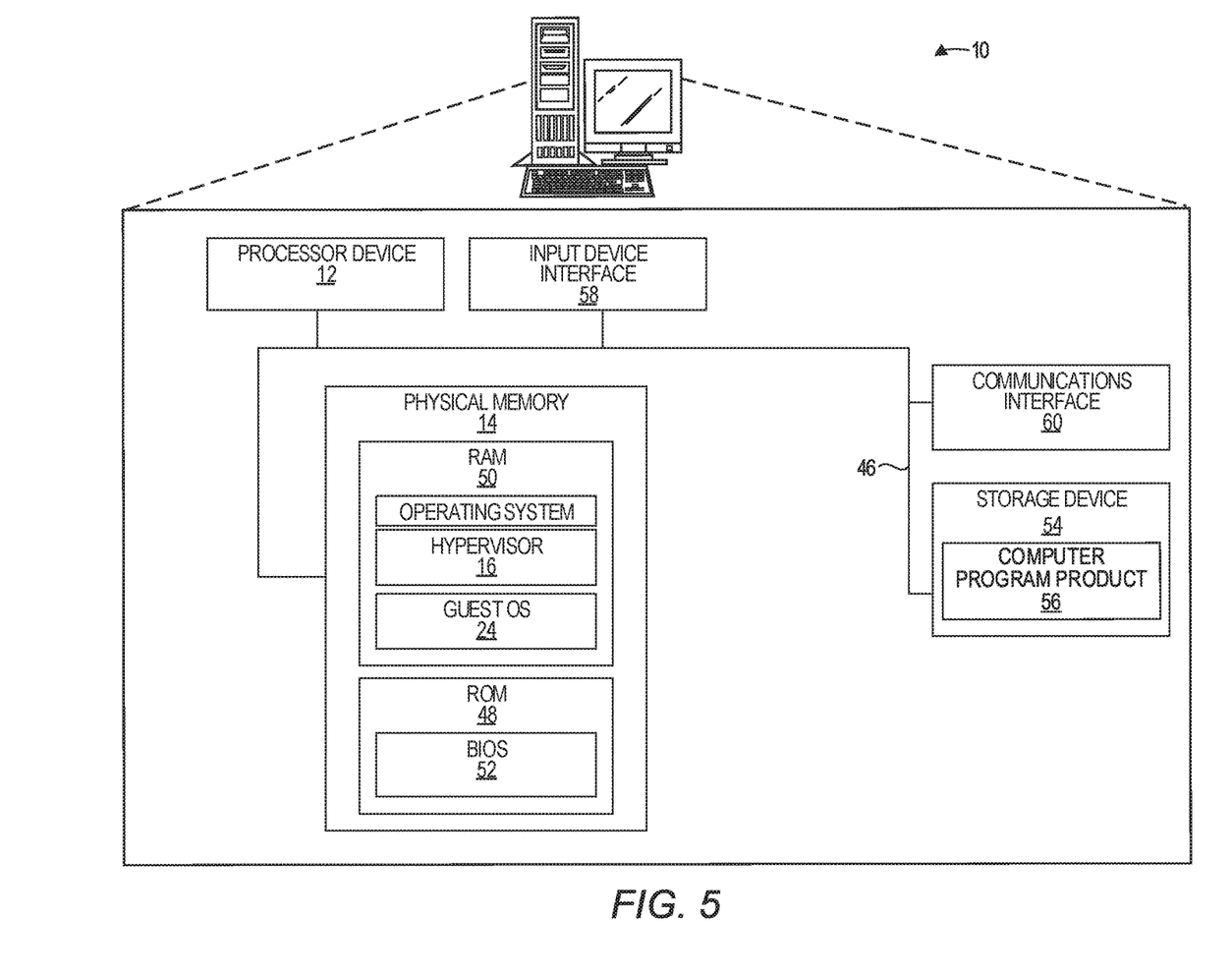
FIG. 5 is a block diagram of the computing host illustrated in FIG. 1 suitable for implementing examples according to one example.

FIG. 5 is a block diagram of the computing host 10 suitable for implementing examples according to one example. The computing host 10 may comprise any computing or electronic device capable of including firmware, hardware, and/or executing software instructions to implement the functionality described herein, such as a computer server, a desktop computing device, a laptop computing device, or the like. The computing host 10 includes the processor device 12, the physical memory 14, and a system bus 46. The system bus 46 provides an interface for system components including, but not limited to, the physical memory 14 and the processor device 12. The processor device 12 can be any commercially available or proprietary processor.

The system bus 46 may be any of several types of bus structures that may further interconnect to a memory bus (with or without a memory controller), a peripheral bus, and/or a local bus using any of a variety of commercially available bus architectures. The physical memory 14 may include non-volatile memory 48 (e.g., read-only memory (ROM), erasable programmable read-only memory (EPROM), electrically erasable programmable read-only memory (EEPROM), etc.), and volatile memory 50 (e.g., random-access memory (RAM)). A basic input/output system (BIOS) 52 may be stored in the non-volatile memory 48 and can include the basic routines that help to transfer information between elements within the computing host 10. The volatile memory 50 may also include a high-speed RAM, such as static RAM, for caching data.

The computing host 10 may further include or be coupled to a non-transitory computer-readable storage medium such as a storage device 54, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 54 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 54 and in the volatile memory 50, including an operating system and one or more program modules, such as the hypervisor 16 and the guest OS 24, which may implement the functionality described herein in whole or in part.

All or a portion of the examples may be implemented as a computer program product 56, which is stored on a transitory or non-transitory computer-usable or computer-readable storage medium, such as the storage device 54, and which includes complex programming instructions, such as complex computer-readable program code, to cause the processor device 12 to carry out the steps described herein. Thus, the computer-readable program code can comprise software instructions for implementing the functionality of the examples described herein when executed on the processor device 12.

An operator may also be able to enter one or more configuration commands through a keyboard, a pointing device such as a mouse (not illustrated), or a touch-sensitive surface such as a display device. Such input devices may be connected to the processor device 12 through an input device interface 58 that is coupled to the system bus 46 but can be connected by other interfaces such as a parallel port, an Institute of Electrical and Electronic Engineers (IEEE) 1394 serial port, a USB port, an IR interface, and the like. The computing host 10 may also include a communications interface 60 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    initiating, by a hypervisor executing on a computing host comprising a processor device, a virtual machine comprising a guest operating system (OS);
    determining, by the hypervisor, that the processor device has a capability to limit access to physical pages of memory to execute-only access;
    communicating, by the hypervisor to the guest OS, information indicating that the processor device has the capability to limit access to physical pages of memory to execute-only access;
    determining, by the guest OS, that a loadable kernel module is to be initiated into a range of memory;
    in response to determining that the processor device has the capability to limit access to physical pages of memory to execute-only access and that the loadable kernel module is to be initiated, sending, by the guest OS to the hypervisor, a request that the range of memory utilized by the loadable kernel module be identified as being execute-only access;
    marking, by the hypervisor, at least one physical page of memory that includes the range of memory as being execute-only access;
    receiving, by the hypervisor from the guest OS, upon termination by the guest OS of the loadable kernel module from the range of memory, a request to identify the range of memory as not being limited to execute-only access; and
    marking, by the hypervisor, the at least one physical page of memory as not being execute-only access.

2. The method of claim 1 wherein determining that the processor device has the capability to limit access to physical pages of memory to execute-only access comprises accessing a control register of the processor device that indicates whether the processor device is capable of limiting access to physical pages of memory to execute-only access.

3. The method of claim 1 wherein communicating, by the hypervisor to the guest OS, the information indicating that the processor device has the capability to limit access to physical pages of memory to execute-only access comprises modifying CPUID information of a virtual processor device that indicates the processor device has a capability to limit access to physical pages of memory to execute-only access.

4. The method of claim 3 further comprising:
    requesting, by the guest operating system, the CPUID information of the virtual processor device; and
    based on the CPUID information, determining that the processor device has the capability to limit access to physical pages of memory to execute-only access.

5. The method of claim 1 wherein receiving, by the hypervisor, the request from the guest operating system comprises receiving, from the guest operating system, a hypercall that includes a range of memory addresses.

6. The method of claim 1 wherein the request from the guest operating system comprises a range of guest operating system memory addresses and further comprising:
   translating the guest operating system memory addresses to a range of physical memory addresses;
   determining at least one physical page of memory that includes memory addressed by the range of physical memory addresses;
   accessing at least one page table entry of a page table, the at least one page table entry corresponding to the at least one physical page of memory; and
   modifying information in the at least one page table entry to identify the at least one physical page of memory as being execute-only access.

7. The method of claim 6 wherein the processor device determines access rights to physical pages of memory based on information in the page table.

8. The method of claim 1 further comprising:
   removing, by the guest OS, the loadable kernel module from the range of memory; and
   communicating the request to identify the range of memory as not being limited to execute-only access.

9. The method of claim 1 further comprising:
   determining, by the hypervisor, that a plurality of physical pages of memory encompasses the range of memory; and
   marking, by the hypervisor, the plurality of physical pages of memory as being execute-only access.

10. A computing device, comprising:
    a memory; and
    a processor device coupled to the memory to:
      initiate a hypervisor;
      initiate, by the hypervisor, a virtual machine comprising a guest operating system (OS);
      determine, by the hypervisor, that the processor device has a capability to limit access to physical pages of memory to execute-only access;
      communicate, by the hypervisor to the guest OS, information indicating that the processor device has the capability to limit access to physical pages of memory to execute-only access;
      determine, by the guest OS, that a loadable kernel module is to be initiated into a range of memory;
      in response to determining that the processor device has the capability to limit access to physical pages of memory to execute-only access and that the loadable kernel module is to be initiated, send, by the guest OS to the hypervisor, a request that the range of memory utilized by the loadable kernel module be identified as being execute-only access;
      mark, by the hypervisor, at least one physical page of memory that includes the range of memory as being execute-only access;
      receive, by the hypervisor from the guest OS, upon termination by the guest OS of the loadable kernel module from the range of memory, a request to identify the range of memory as not being limited to execute-only access; and
      mark, by the hypervisor, the at least one physical page of memory as not being execute-only access.

11. The computing device of claim 10 wherein the request from the guest operating system comprises a range of guest operating system memory addresses, and wherein the processor device is further to:
    translate, by the hypervisor, the guest operating system memory addresses to a range of physical memory addresses;
    determine, by the hypervisor, at least one physical page of memory that includes memory addressed by the range of physical memory addresses;
    access, by the hypervisor, at least one page table entry of a page table, the at least one page table entry corresponding to the at least one physical page of memory; and
    modify, by the hypervisor, information in the at least one page table entry to identify the at least one physical page of memory as being execute-only access.

12. A computer program product stored on a non-transitory computer-readable storage medium and including instructions configured to cause a processor device to:
    initiate a hypervisor;
    initiate, by the hypervisor, a virtual machine comprising a guest operating system (OS);
    determine, by the hypervisor, that the processor device has a capability to limit access to physical pages of memory to execute-only access;
    communicate, by the hypervisor to the guest OS, information indicating that the processor device has the capability to limit access to physical pages of memory to execute-only access;
    determine, by the guest OS, that a loadable kernel module is to be initiated into a range of memory;
    in response to determining that the processor device has the capability to limit access to physical pages of memory to execute-only access and that the loadable kernel module is to be initiated, send, by the guest OS to the hypervisor, a request that the range of memory utilized by the loadable kernel module be identified as being execute-only access;
    mark, by the hypervisor, at least one physical page of memory that includes the range of memory as being execute-only access;
    receive, by the hypervisor from the guest OS, upon termination by the guest OS of the loadable kernel module from the range of memory, a request to identify the range of memory as not being limited to execute-only access; and
    mark, by the hypervisor, the at least one physical page of memory as not being execute-only access.

13. The computer program product of claim 12 wherein the request from the guest operating system comprises a range of guest operating system memory addresses, and wherein the instructions are further configured to cause the processor device to:
    translate, by the hypervisor, the guest operating system memory addresses to a range of physical memory addresses;
    determine, by the hypervisor, at least one physical page of memory that includes memory addressed by the range of physical memory addresses;
    access, by the hypervisor, at least one page table entry of a page table, the at least one page table entry corresponding to the at least one physical page of memory; and modify, by the hypervisor, information in the at least one page table entry to identify the at least one physical page of memory as being execute-only access.

\* \* \* \* \*